Jan. 27, 1959　　　　P. J. DAVIS　　　　2,870,932
MINNOW AND TACKLE CONTAINER
Filed March 21, 1958　　　　2 Sheets-Sheet 1
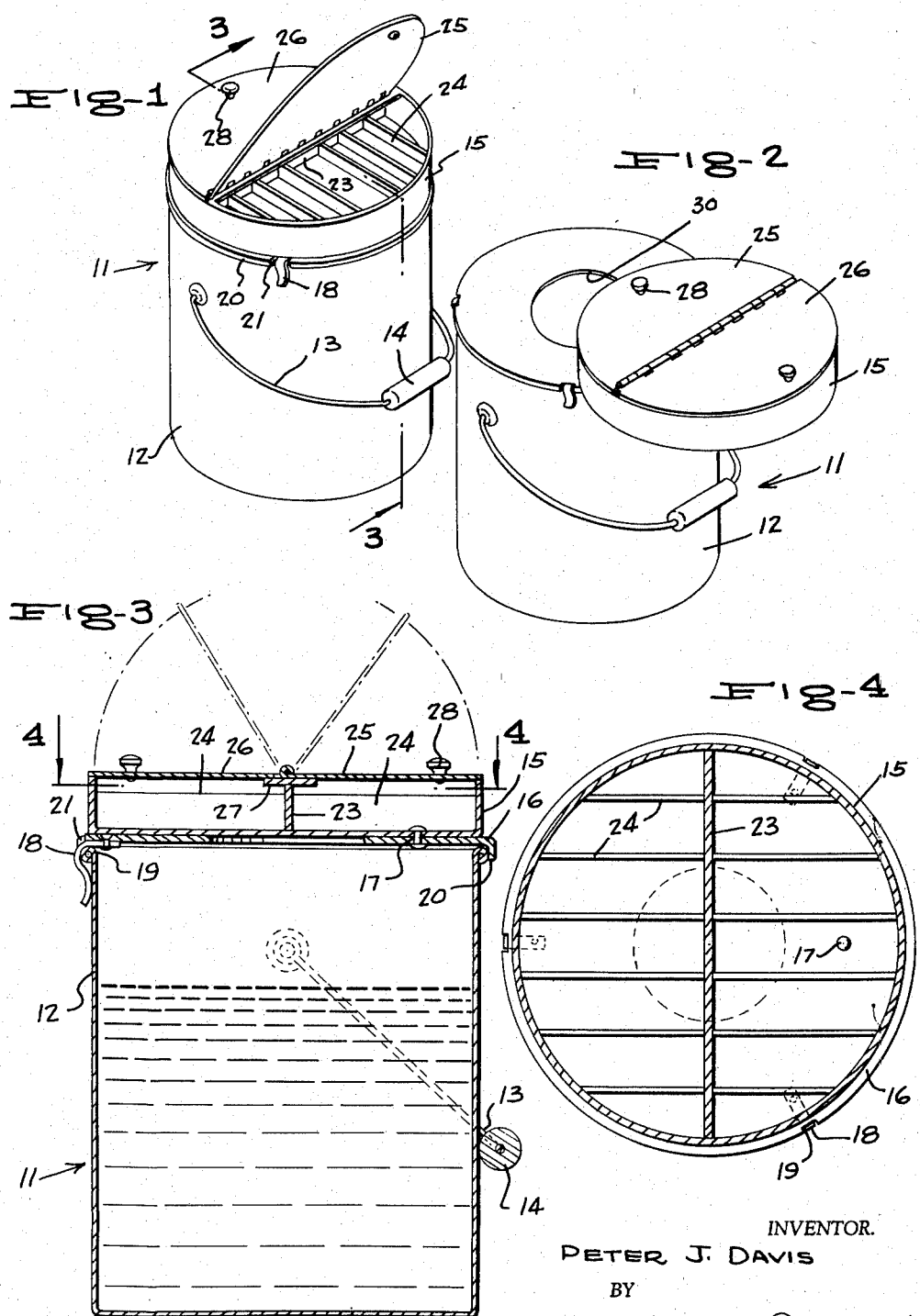
INVENTOR.
PETER J. DAVIS
BY
McMorrow, Berman & Davidson
ATTORNEYS Jan. 27, 1959 P. J. DAVIS 2,870,932
MINNOW AND TACKLE CONTAINER
Filed March 21, 1958 2 Sheets-Sheet 2

INVENTOR.
PETER J. DAVIS
BY
McMorrow, Berman & Davidson
ATTORNEYS

United States Patent Office 2,870,932
Patented Jan. 27, 1959

2,870,932
MINNOW AND TACKLE CONTAINER
Peter J. Davis, Camden, Ark.
Application March 21, 1958, Serial No. 722,947
2 Claims. (Cl. 220—23)

This invention relates to fishermen's equipment, and more particularly to a combination minnow bucket and fishing tackle container.

A main object of the invention is to provide a novel and improved combination receptacle for fish bait and for fishing tackle, said receptacle being simple in construction, being relatively compact in size, and providing a convenient and readily accessible means for carrying fish bait, such as minnows, or the like, and for carrying and storing tackle, such as lures or other artificial bait.

A further object of the invention is to provide an improved combination minnow bucket and fishing tackle receptacle, the combination receptacle being inexpensive to manufacture, being durable in construction, and eliminating the need of carrying an extra container for fishing tackle.

Further objects and advantages of the invention will become apparent from the following description and claims, and from the accompanying drawings, wherein:

Figure 1 is a perspective view of a combination minnow bucket and tackle box constructed in accordance with the present invention, with the tackle box shown in covering position relative to the minnow bucket and illustrating the manner in which one of the hinged covers of the tackle box may be opened to provide access to its contents.

Figure 2 is a perspective view, similar to Figure 1, showing the tackle box swung outwardly to allow access through the top opening of the minnow bucket.

Figure 3 is an enlarged vertical cross sectional view taken on the line 3—3 of Figure 1 with the tackle box in its closed position.

Figure 4 is a horizontal cross sectional view taken on the line 4—4 of Figure 3.

Figure 5:
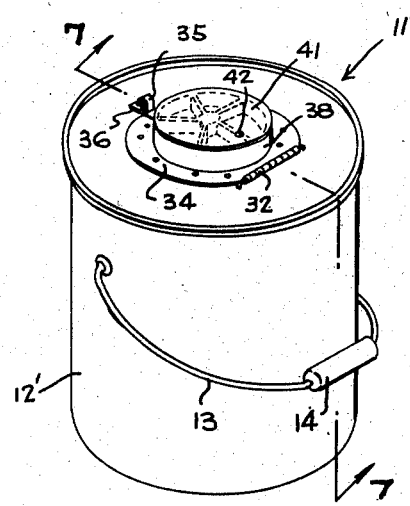
Figure 5 is a perspective view of a modified form of combination minnow bucket and tackle box constructed in accordance with the present invention.

Referring to the drawings, and particularly to Figures 1 to 4, 11 generally designates a combination minnow bucket and tackle box according to the present invention. The device 11 comprises a bucket 12 adapted to contain minnows or similar bait, the bucket being provided with the bail 13 which is provided further with a handle 14 for transporting the device. Designated at 15 is a relatively flat circular tackle box substantially the same in diameter as the bucket 12, the tackle box being pivotally mounted on a flat annular plate member 16, the pivotal connection of the receptacle 15 to the plate member 16 being located a substantial distance from the vertical axis of the tackle box and comprising a rivet 17 which extends through the bottom wall of the tackle box and through the annular plate member 16.

Secured to the annular plate member 16 at equally spaced locations adjacent its periphery are a plurality of depending spring clips 18 which are lockingly engageable over the top rim 19 of the bucket 12, as is clearly shown in Figures 1 and 3. The annular member 16 is preferably provided with a depending peripheral flange 20 engageable over the rim 19, as shown in Figure 3, said flange being formed with respective notches 21 to receive the spring clips 18.

The tackle box 15 is provided with a diametrically extending main partition wall 23 and with a plurality of auxiliary vertical partition walls 24 extending perpendicular to the intermediate partition wall 23 to define a plurality of compartments for receiving lures or other artificial bait. The compartments thus defined may also be employed for storing other small articles of fishing tackle. Thus, two major compartments are defined on opposite sides of the transverse main vertical wall 23, said major compartments being further subdivided into small individual compartments by the parallel vertical partition plates 24 therein.

Respective semi-circular hinged covers 25 and 26 are provided, said covers being hinged to a horizontal, diametrically extending top plate member 27 rigidly secured in the tackle box on the top edge of the vertical diametrical wall 23, the hinged cover segments 25 and 26 being swingable upwardly, as shown in the dotted view in Figure 3, to provide access to the contents of the tackle box. Each hinged cover is provided with a suitable handle knob 28 for opening same.

As shown in Figure 2, the tackle box 15 may be swung outwardly to expose the central opening 30 in the annular cover plate 16, whereby to provide access to the contents of the minnow bucket 12.

Figure 6:
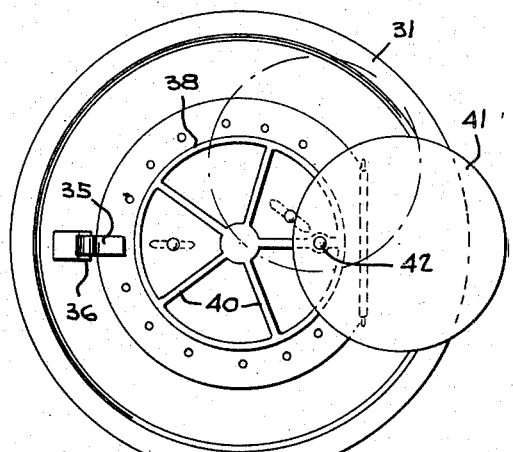
Figure 6 is an enlarged top view of the device illustrated in Figure 5 with the cover of the tackle box swung outwardly to provide access to the contents of the tackle box.
Figure 7:
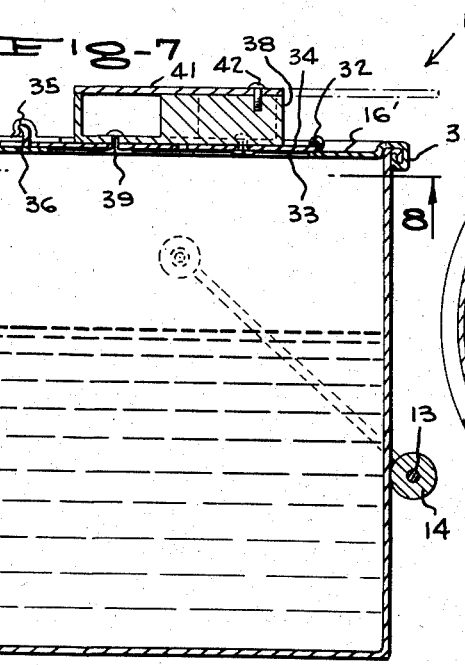
Figure 7 is an enlarged vertical cross sectional view taken on the line 7—7 of Figure 5.
Figure 8:
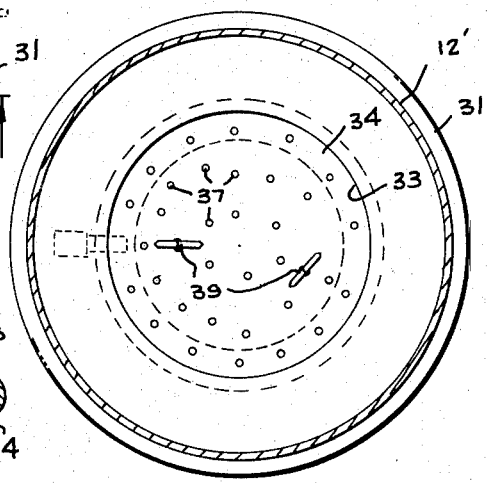
Figure 8 is a horizontal cross sectional view taken on the line 8—8 of Figure 7.

Referring now to the form of the invention shown in Figures 5 to 8, the device is designated generally at 11' and comprises a minnow bucket 12' generally similar to the minnow bucket previously described except that it is provided with an annular top wall 16' which is permanently secured to the top rim of the minnow bucket 12', as by a crimped joint, shown at 31. Hinged at 32 to the plate 16' adjacent the edge of the central opening 33 is a circular plate member 34 which is provided opposite the hinge 32 with a resilient hook-like spring catch 35 lockingly engageable with an upstanding detent lug 36 secured on the wall 16' opposite the hinge 32, as is shown clearly in Figure 7. The circular plate 34 is formed with a plurality of ventilating apertures 37 distributed over its area. Designated at 38 is a circular tackle box which is substantially smaller in diameter than the circular plate 34 and which is fixedly secured on the circular plate 34 substantially centrally thereof by suitable fasteners 39, for example, conventional headed fasteners of the type having a pair of bendable prongs which may be spread apart after the fasteners have been inserted whereby to retain the fasteners in their apertures. Thus, the fasteners 39 are engaged through apertures provided in the bottom wall of the tackle box 38 and pass through subjacent apertures provided in the circular cover 34, the lower portions of the prongs of the fasteners being spread apart as illustrated in Figure 7.

A circular tackle box 38 is provided with the radial vertical partition walls 40 defining a plurality of sector-shaped compartments in the box adapted to receive various articles of fishing tackle, such as lures, or the like. Designated at 41 is a circular top cover of the same diameter as the tackle box 38, said cover being swingably connected to the top edge of one of the radial partition walls 40, as by a pivot screw 42, the pivotal connection defined by the screw 42 being located adjacent the outer wall of the tackle box so that the cover 41 may be swung to a position such as that shown in Figure 6 to provide access to all of the compartments in the tackle box, if desired. As shown, in Figures 6 and 7, the pivot bolt 42 is preferably located on the radial partition wall 40 most closely adjacent to the transversely extending hinge 32 whereby possible interference of the cover 41 with access to the releasable spring catch 35 is avoided.

As shown in Figure 6, the cover 41 may be swung to its outwardly extending position to provide access to the contents of the tackle box. When it is desired to obtain access to the minnow bucket 12', the tackle box may be swung upwardly to expose the opening 33 in the top wall 16'.

While certain specific embodiments of an improved combination minnow bucket and tackle box have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a bucket adapted to contain minnows or similar bait, a centrally apertured horizontal top wall member on said bucket providing access to the contents of the bucket through the aperture thereof, and a tackle box pivotally connected to said top wall member on a vertical pivot axis, said tackle box being formed and arranged to at times cover the central aperture of said top wall member but being swingable horizontally at other times to an uncovering position relative to said aperture, said tackle box being provided with a top cover swingably mounted thereon.

2. In combination, a bucket adapted to contain minnows or similar bait, a centrally apertured horizontal top wall member on said bucket providing access to the contents of the bucket through the aperture thereof, a generally circular tackle box larger in area than the central aperture of said top wall member and disposed on said top wall member to normally cover said central aperture, means pivotally connecting an edge portion of said tackle box to said top wall member for horizontal swinging movement on a vertical axis so as to at times uncover said central aperture, and a top cover hinged to said tackle box and being swingable to provide access to the interior of said box.

References Cited in the file of this patent
UNITED STATES PATENTS

| | | |
|---|---|---|
| 566,903 | Gieschen | Sept. 1, 1896 |
| 1,525,195 | Olson | Feb. 3, 1925 |
| 1,587,785 | Marsh et al. | June 8, 1926 |
| 1,617,994 | Eaton | Feb. 15, 1927 |
| 1,791,346 | Burch et al. | Feb. 3, 1931 |
| 2,153,549 | Cooper | Apr. 11, 1939 |
| 2,797,525 | McCord | July 2, 1957 |